(12) United States Patent
Muller

(10) Patent No.: US 6,385,858 B1
(45) Date of Patent: May 14, 2002

(54) SPACING TOOL

(75) Inventor: John J. Muller, Sparks, NV (US)

(73) Assignee: Trex Company, L.L.C., Winchester, VA (US)

( * ) Notice: Subject to any disclaimer, the term of this patent is extended or adjusted under 35 U.S.C. 154(b) by 0 days.

(21) Appl. No.: 09/480,039

(22) Filed: Jan. 10, 2000

(51) Int. Cl.⁷ .............................................. G01B 3/30
(52) U.S. Cl. ........................................ 33/526; 33/613
(58) Field of Search ............................ 33/42, 526, 427, 33/428, 452, 464, 481, 613, 501.45, 494, 679.1, 501, 451.7, 199 R, 116, 562

(56) References Cited

U.S. PATENT DOCUMENTS

| | | |
|---|---|---|
| 89,281 A | 4/1869 | Bordner |
| 1,549,671 A | 8/1925 | Kridler et al. |
| 1,742,103 A | 12/1929 | Sholtes |
| 2,466,919 A | 4/1949 | Sykes ........................... 33/180 |
| 2,744,334 A | 5/1956 | Jondole ........................ 33/180 |
| 2,797,495 A | 7/1957 | Walston ....................... 33/180 |
| 2,930,135 A | 3/1960 | Rodtz, Sr. ..................... 33/180 |
| 3,031,669 A | 5/1962 | Lawson ......................... 1/49.8 |
| 3,104,473 A | 9/1963 | Rose ............................ 33/180 |
| 3,174,227 A | 3/1965 | House .......................... 33/180 |
| 3,290,712 A | 12/1966 | Richey ....................... 15/105.5 |
| 3,735,497 A | 5/1973 | Boettcher ..................... 33/180 |
| 4,420,921 A | 12/1983 | Hardin ......................... 52/749 |
| 4,625,415 A | 12/1986 | Diamontis .................... 33/180 |
| 4,686,769 A | 8/1987 | Rock et al. ................... 33/197 |
| 4,850,114 A | 7/1989 | Vockins ........................ 33/526 |
| 4,930,225 A | 6/1990 | Phillips ........................ 33/526 |
| 4,955,142 A | 9/1990 | Rieck ........................... 33/526 |
| 5,031,886 A * | 7/1991 | Sosebee ........................ 269/41 |
| 5,048,195 A | 9/1991 | Leonov ........................ 33/645 |
| 5,129,153 A * | 7/1992 | Burns, Sr. .................... 33/613 |
| 5,201,130 A | 4/1993 | Krchnak ...................... 33/526 |
| 5,288,534 A | 2/1994 | Tavshanjian ................. 428/64 |
| 5,353,509 A * | 10/1994 | Black .......................... 33/451 |
| 5,471,757 A * | 12/1995 | McDonald ............... 33/501.45 |
| 5,524,354 A * | 6/1996 | Bartzke et al. ............... 33/561 |
| 5,560,117 A | 10/1996 | Tallman ....................... 33/526 |
| 5,604,988 A | 2/1997 | Costelloe ..................... 33/501 |
| 5,875,558 A * | 3/1999 | Bakke et al. ............ 33/501.45 |
| 5,884,408 A * | 3/1999 | Simmons ..................... 33/494 |

\* cited by examiner

*Primary Examiner*—Christopher W. Fulton
*Assistant Examiner*—Gail Verbitsky
(74) *Attorney, Agent, or Firm*—MacCord Mason PLLC

(57) ABSTRACT

A spacing tool for determining the spacing between adjacent members of a structure including a pair of perpendicular planes, the planes intersecting along a line offset from the centerline of each plane, the pair of perpendicular planes including a first planar member having a first width corresponding to a first desired spacing between adjacent members in a structure; and a second planar member having a second width corresponding to a second desired width between adjacent members in a structure, the second desired width being less than the first desired width. Each of the first and second planar members further includes a side edge, and the spacing tool further includes first and second thickness indicia positioned on the first planar member side edge and the second planar member side edge respectively. The indicia correspond to the first width and the second width.

14 Claims, 4 Drawing Sheets

SPACING TOOL

BACKGROUND OF THE INVENTION

(1) Field of the Invention

The present invention relates to the field of measuring devices, and, more particularly to a tool for maintaining a constant spacing between adjacent members of a structure. The invention is particularly suited for spacing the ends or sides of boards and the like being installed on a structure.

(2) Description of the Prior Art

When constructing structures it is sometimes necessary to install boards or decking and the like in a regular spaced apart relationship. This regular spacing may be required in a side-to-side fashion or in an end-to-end fashion. It is near impossible to maintain this relationship between boards accurately by relying on visual inspection of the gaps between boards as they are being installed.

To address this problem, a variety of tools have been devised to be inserted between boards as they are installed to maintain a regular spacing. Typical of these are the decking board spacers disclosed in U.S. Pat. No. 4,930,225 to Phillips and U.S. Pat. No. 5,560,117 to Tallman. Another deck spacing tool is disclosed in U.S. Pat. No. 4,955,142 to Rieck. This tool includes two substantially vertically extending blades that are formed integrally with a pair of substantially horizontally extending stabilizing arms extending from the base of each blade. The opposing blades have different thickness in order to allow for a varying spacing between deck boards as the boards are installed by the user. Although this tool does function adequately for its intended purpose, it does suffer from certain drawbacks. First, when a blade of a desired thickness is inserted between decking boards, that blade is hidden below the stabilizing arms. The blade that is exposed to the user is of a different thickness than the blade that is actually inserted between the boards. Thus, a user may mistakenly position the tool so that the desired thickness is visible under the mistaken belief that the hidden blade is of the same thickness. This misconception has caused boards to be installed with improper spacing. Another disadvantage with this tool is that it is bulky and takes up an inordinate amount of space in a toolbox. Lastly, if one of the vertically extending blades is broken off from the body of the device, then either the device must be thrown away or a second tool must be purchased in order to be able to use more than one spacing dimension.

There is a need then for a spacing tool that is compact and is capable of measuring a plurality of different gaps between adjacent members of a structure. The tool should be resistant to breakage and should be repairable given the rough and tumble environment typically encountered at construction sites.

SUMMARY OF THE INVENTION

The present invention relates to a spacing tool for determining the spacing between adjacent members of a structure including a pair of perpendicular planes, said planes intersecting along a line offset from the centerline of each plane, said pair of perpendicular planes including: (i) a first planar member having a first width corresponding to a first desired spacing between adjacent members in a structure; and (ii) a second planar member having a second width corresponding to a second desired spacing between adjacent members in a structure. The second desired spacing is less than the first desired spacing. The spacing tool further includes first and second thickness indicia positioned on the first planar member and on the second planar member respectively. The indicia correspond to the first width and the second width respectively.

The present invention further relates to a kit for assembling a decking board spacing tool capable of creating a plurality of different gaps between adjacent members in a structure including a plurality of interlocking planar members, each of which has a different width, each of said widths corresponding to a desired spacing between adjacent members in a structure and a slot formed in each planar member of the plurality of planar members, each of the slots positioned along a line offset from the centerline of each planar member. Any two of the plurality of the planar members may be interconnected along the slots so as to form a substantially perpendicular relationship therebetween such that when one of the interconnected planar members is positioned between two adjacent members in a structure, at least one surface thereof is visible to a user.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENT

Figure 1A:
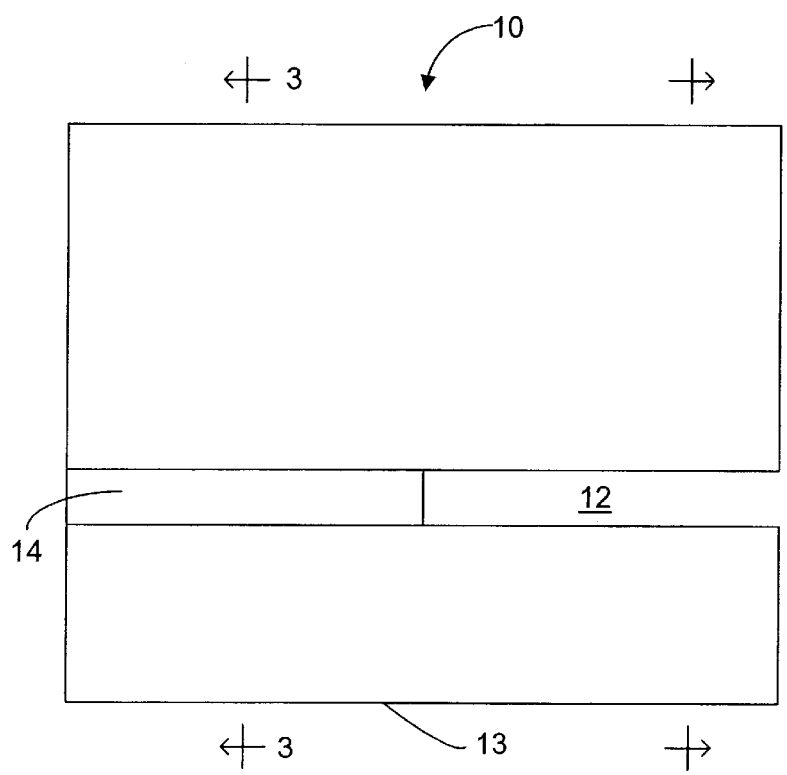
FIGS. 1A and 1B are planned and side elevational views of the first planar member of the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1B:
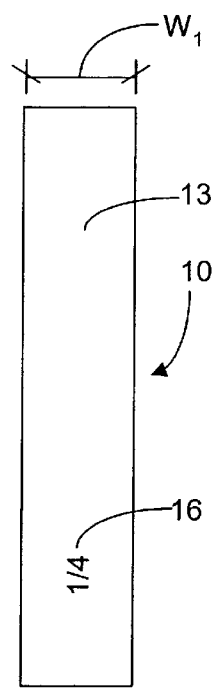
Figure 2A:
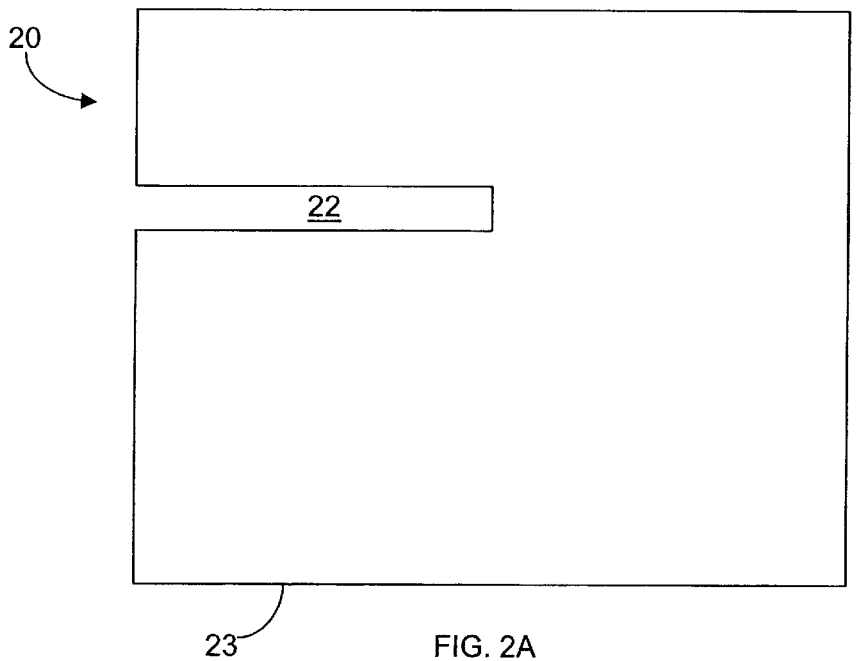
FIGS. 2A and 2B are planned and side elevational views of the second planar member of the spacing tool of the present invention.
Figure 2B:
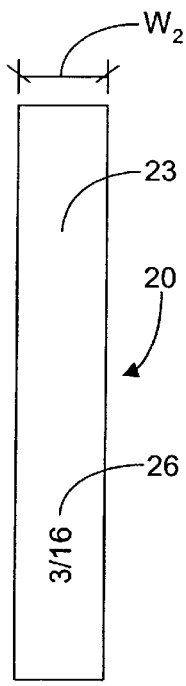
Figure 6:
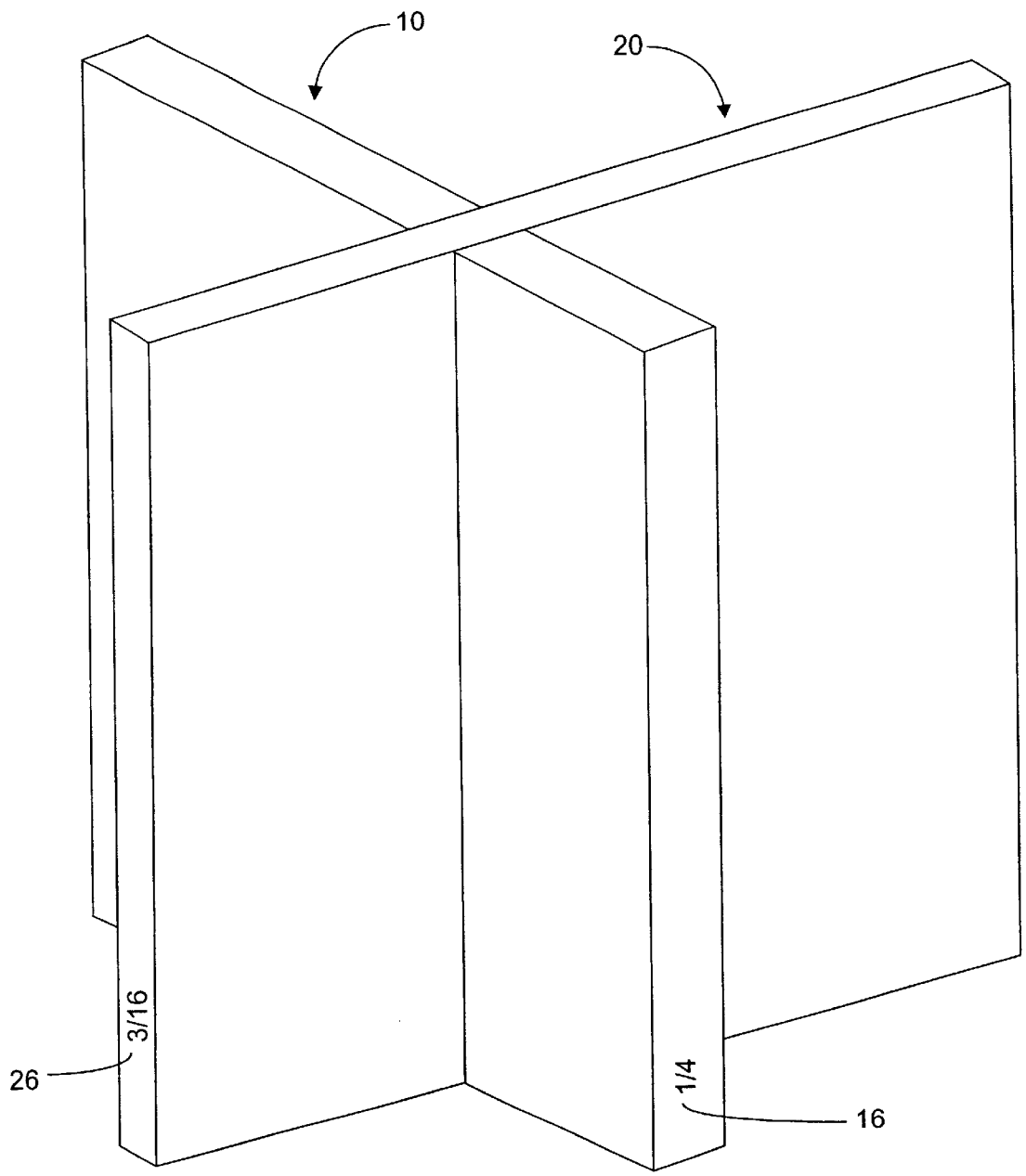
FIG. 6 is a perspective view of the first and second planar members of the present invention after they have been interlocked.

Referring now to the drawings in general and FIG. 1 in particular, it will be understood that the illustrations are for the purpose of describing a preferred embodiment of the invention and are not intended to limit the invention thereto. As best seen in FIG. 6, the spacing tool of the present invention includes a pair of perpendicular planes 10, 20 which intersect along a line that is offset from the centerline of each plane. Referring now to FIG. 1A–2B, the pair of perpendicular planes includes a first planar member 10 having a first width $W_1$ corresponding to a first desired spacing between adjacent members in a structure and a second planar member 20 having a second width, $W_2$ corresponding to a second desired width between adjacent members in a structure. The width of the second planar members 20 is less than that of the first desired width of the first planar member. Each of the planar member 10, 20 further includes a side edge 13, 23. First and second thickness indicia 16, 26 are positioned on the first planar member and second planar member 10, 20 respectively. The indicia 16, 26 correspond to and inform the user of the width of each of the planar members 10, 20.

The planar members 10,20 may be of any suitable size for their intended purpose. In a preferred embodiment the members have a width of about 3.25 in. and a length of about 4 in. These dimensions may be varied according to the nature of the structure with which they are used.

The planar members 10, 20 may be constructed of any suitable material capable of standing up to the rigors of a construction site environment. Thus, a lightweight metal such as aluminum could be used. More desirably, a suitable thermoplastic material would be used to include polyethylene, polyethylene copolymers, polypropylene and copolymers thereof. Another suitable thermoplastic material is acrylonitrile butadiene styrene (ABS). The planar members 10, 20 may be formed using well-known thermoplastic fabrication techniques such as injection molding. Alternatively, they may be fabricated from flat sheets of thermoplastic material. Another suitable material would include thermosetting materials, although these may be not as desirable given their tendency to be more brittle than thermoplastics. In certain situations where the gap between members must be set to a very fine tolerance, it may be necessary to consider the coefficient of thermal expansion of the material selected for the planar members 10, 20. It will be readily appreciated that if the planar member 10, 20 expands or contracts excessively in response to an ambient temperature change, then the actual width of the members may not match that displayed by the width indicia 16, 26.

The width indicia 16, 26 may take a wide variety of forms. One category of indicia would include various types of alphanumeric indicia. These include the fractional numeric indicia 16, 26 illustrated in FIGS. 1B and 2B. In this preferred embodiment the first planar member 10 has a width of ¼ inch and thus is labeled with the fractional indicator "¼" and the second planar member 20 has a thickness of 3/16 of an inch and is labeled with the fractional indicator "3/16". It will be readily appreciated that various other widths and associated fractional indicators may be used. In an alternative embodiment alphabetical indicia may be used that, rather than inform the user of the width of the planar member 10, 20 inform the user of the particular location in a structure for which the members intended. For example, in the case of applying decking boards to a deck structure, one gap may be desired for the end spacing of the boards whereas a different gap may be desired for the side-to-side spacing of the decking boards. thus, the indicium for the first of these applications may read "end-to-end" and the indicium for the second of these applications may read "edge-to-edge" or "side-to-side". It should be understood that the spacing tool of the present invention is not limited in use to decking boards and at various other alphabetical indicia may be used depending on the nature of the structure with which it is employed.

Another approach for providing a readily ascertainable thickness indicia includes the use of color. For example, the first and second indicia may be comprised of a first color corresponding to a first width or thickness of the first planar member 10 and a second color corresponding to a second width of the second planar member 20. In one embodiment the color indicia may comprise a color dot applied to the side edges 13, 23 of the planar members 10, 20. In another embodiment the first and second color indicia may be comprised of providing at least a portion of the first planar member colored with the first color and at least a portion of the second planar member being colored with the second color.

Figure 4:
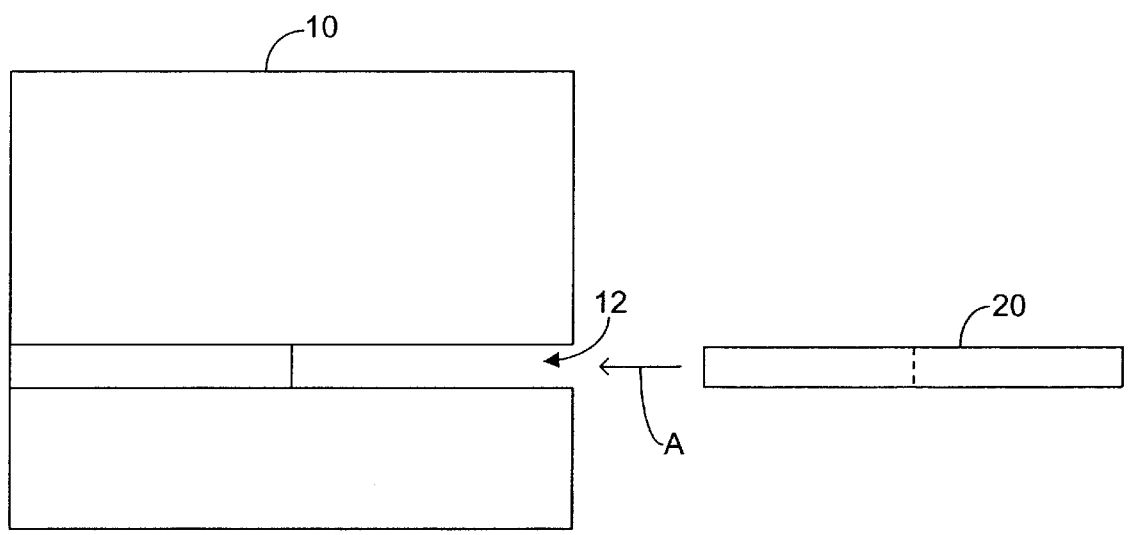
FIG. 4 is schematic illustration of the interlocking of the first and second planar embers of the present invention.
Figure 5:
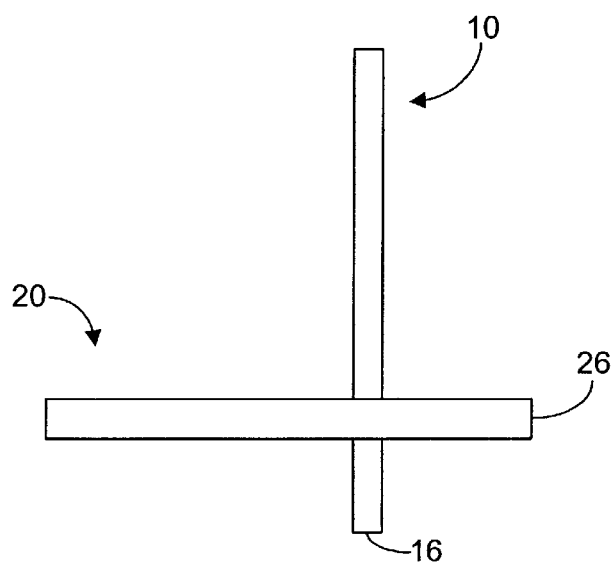
FIG. 5 is an end view of the interlocked first or second planar members after they have been joined as shown in FIG. 4.

The first and second planar members 10, 20 are joined in an interlocking relationship as provided by slots 12, 22 formed in the first and second planar members respectively. Each slot is straight-walled and extends from a side edge of each planar member towards the center thereof. As best seen in FIG. 4, the planar members are joined by aligning the members in a substantially perpendicular relationship and assembling the members in the direction indicated by arrow "A" using each member's slotted portion. An end view of the thus assembled planar members 10, 20 is illustrated in FIG. 5.

In a preferred embodiment each of the slots 12, 22 is positioned so as to be offset from the centerline of each of the planar members. As best illustrated in FIGS. 5 and 6, this offset results in the planar members intersecting in an interlocking relationship along a line that is offset from the center line of each of the planar members.

Figure 3:
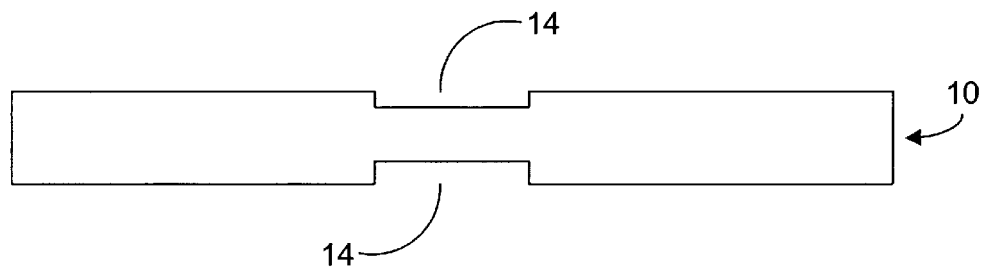
FIG. 3 is a cross-sectional view of the first planar member taken along line 3—3 of FIG. 1A.

The stability of the interlocked planar members may be increased by the provision of at least one stabilizing groove 14 in the first planar member 10 as illustrated in FIGS. 1A and 3. Desirably stabilizing grooves are provided formed into opposing side surfaces of the first planar member 10. Typically the stabilizing grooves are formed in the wider of the planar members. The grooves 14 permit the width of the slot 22 in the thinner of the two planar members to be more narrow than would otherwise be necessary.

The spacing tool of the present invention has been described thus far with reference to first and second planar members 10, 20. However, another aspect of the present invention includes providing a kit for assembling a spacing tool capable of creating a plurality of varying gaps between members being installed on a structure. Again, one particularly useful application for this kit is a decking board spacing tool capable of creating a plurality of varying gaps between decking boards. The kit includes a plurality of interlocking planar members of varying thickness' with each of the planar members including a slot for interlocking connection to another one of the plurality of planar members. Any two of the plurality of planar members can be joined using the slots so as to form a substantially perpendicular relationship therebetween. Desirably, the slot provided in each of the plurality of planar members has a common dimension so that no matter what the thickness of each of the planar members, any two of the planar members may be assembled. Each of the planar members having a width greater than that common dimension includes the stabilizing grooves described above. Each of the planar members in the kit will be provided with an indicium positioned on at least one surface thereof so as to be visible to a user of the spacing tool. This indicium may be provided using any one of the techniques discussed herein above.

From FIG. 5 it will be appreciated that when the planar members are assembled in their substantially perpendicular relationship, they form a "T". This T is composed of a first leg having a first width or thickness and a second leg having a second width or thickness. Each of the legs of the T is provided with an indicium 16, 26 that communicates to the user of the spacing tool the width or thickness of that particular leg of the T.

Figure 7:
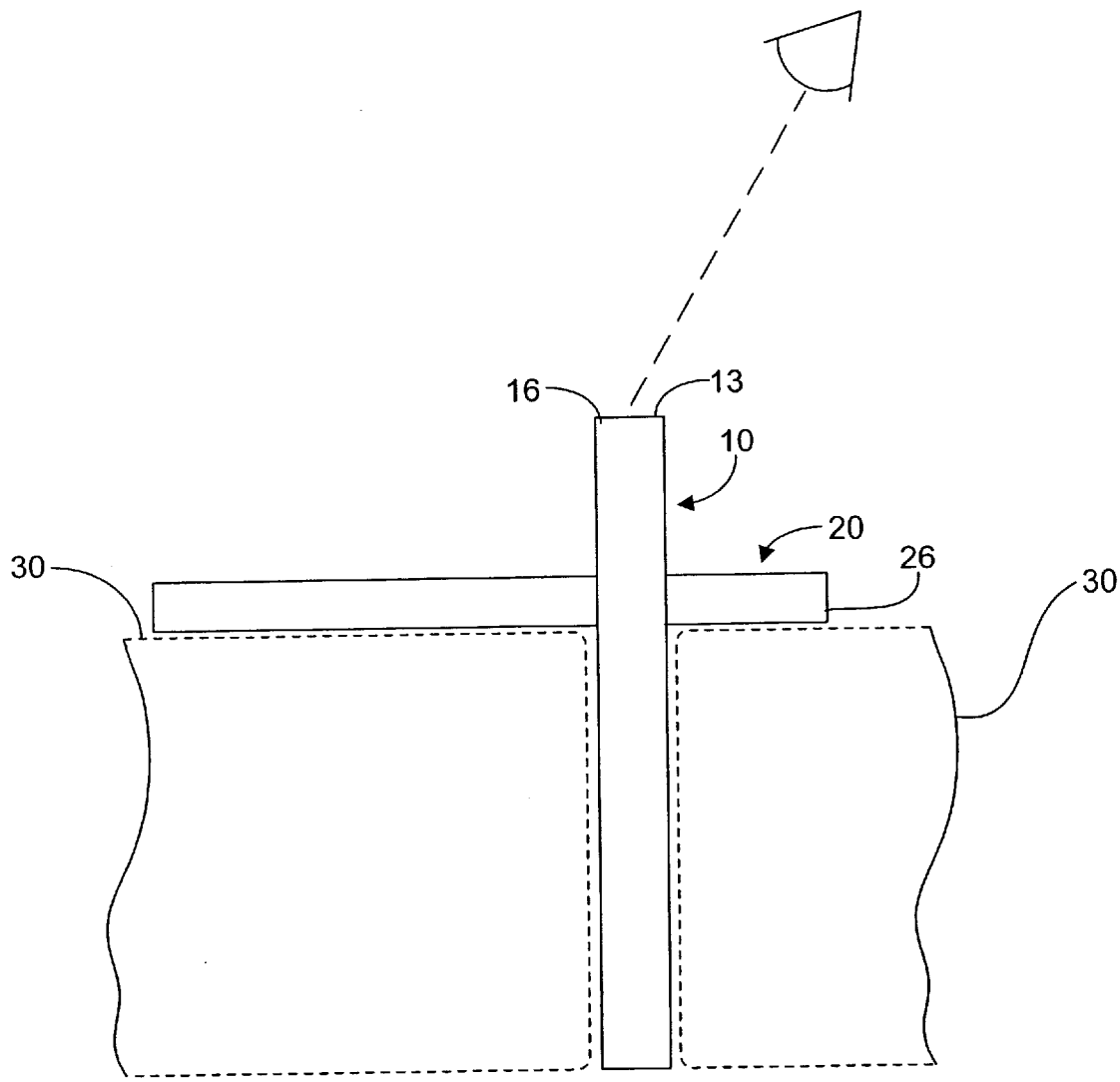
FIG. 7 is a partial cutaway view showing the spacing tool of the present invention being used to set the gap between two members of a structure.

Some of the advantages of the spacing tool of the present invention are illustrated in FIG. 7. The first planar member 10 has been inserted between two structural members 30 so that the members 30 butt up against the first planar member 10. The second planar member 20, because of its substantially perpendicular relationship with the first planar member 10, maintains the first planar member 10 in a straight position and serves to stabilize the spacing tool in position. The first planar member's side edge 13 is positioned so as to be visible to the user when the spacing tool is in position. Significantly, the indicium 26 for the planar member 20 not being used is not pointed upwardly towards the user. Thus, a possibility for any confusion concerning what gap is actually being set between the structure members 30 is reduced significantly.

The present invention provides a number of advantages over prior art spacing tools, one of which includes the fact that the user is provided accurate feedback concerning the gap actually being set by the tool at any given time. The width of the gap being established between structural members is always visible to the user. Moreover, when the user has completed the gapping operation, the spacing tool may be disassembled and the two flat, planar members may be stowed in a toolbox while taking up a minimum of room. The rough and tumble environment found in many construction sites leads to the breakage of a variety of tools. This is particularly true when the tools are formed of a thermoplastic material. Should the hand tool disclosed in the Rieck patent be broken, its effectiveness may be severely compromised, and it is likely that the entire tool must be replaced. Conversely, with the present invention, should one of the planar members be broken the other planar member is still usable and the broken planar member may be replaced easily.

Yet another advantage of the present invention is its ability to be provided in kit form. This feature provides the ability to set several different gaps between structural members by assembling any two planar members from a plurality of planar members in the interlocking relationship described above. This feature greatly magnifies the usefulness of the tool.

Although several of the many advantages of the present invention have been discussed above, it should be understood that the present invention provides numerous additional advantages. While these advantages may not be discussed here, they will be readily apparent to one of ordinary skill.

Certain modifications and improvements will occur to those skilled in the art upon a reading of the foregoing description. By way of non-limiting example, a spacing tool according to the present invention could be assembled with planar members 10, 20 having the same width. This arrangement would be suitable for a situation where the same gap will be set between a large number of members. In this situation, it may be more convenient for the installer not to have to determine which of two different planar members must be inserted between the structural members. The installer may simply pick up the tool and insert either one of the planar members between the structural members knowing that the proper gap will be set.

Yet another modification to the present invention includes the pair of intersecting planes intersecting along a line that is the centerline of each plane. In this embodiment an equal length of each plane extends beyond either side of the line of intersection. This approach, while not a preferred embodiment, would function adequately. One advantage of the offset line of intersection is its ability to signal to the user which portion of the planar member should be inserted between structural members. That is, the longer of the two legs extending from the line of intersection typically should be installed between the structural members being gapped. The longer leg may be desirable when gapping members that do not have completely flat upper surfaces. Achieving the same leg length with the line of intersection positioned on the centerline of the planes results in excess material extending upwardly from the structural members. This situation does not necessarily effect the functionality of this embodiment, but does result is less than optimal use of materials.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What I claim is:

1. A spacing tool for determining the spacing between adjacent members of a structure comprising:
    (a) a first planar member having a first uniform width corresponding to a first desired width for providing a first spacing measurement, said first planar member having a first side edge and a first slot extending inwardly from said first side edge; and
    (b) a second planar member having a second different uniform width corresponding a second different desired width for providing a second spacing measurement, said second width being less than said first width, said second planar member having a second side edge and a second slot extending inwardly from said second side edge, said first and second planar members being perpendicularly interconnectable by inserting said first planar member into said second slot and said second planar member into said first slot, and directing said second planar member into a stabilizing groove formed on a surface of said planar member.

2. The spacing tool of claim 1, wherein said first and second planar members each have a substantially rectangular shape.

3. The spacing tool of claim 1, wherein said stabilizing groove aligned with said first slot.

4. The spacing tool of claim 1, wherein said first and second planar members include width indicia corresponding to the widths of said planar members.

5. The spacing tool of claim 1, wherein said indicia are on side edges of said planar members.

6. The spacing tool of claim 1, wherein the slots in said planar members are offset from the centerlines of said planar members.

7. A spacing tool for determining the spacing between adjacent members of a structure comprising:
    (a) a first planar member having a first uniform width corresponding to a first desired width for providing a first spacing measurement, said first planar member having a first side edge and a first slot extending inwardly from said first side edge; and (b) a second planar member having a second different uniform width corresponding a second different desired width for providing a second spacing measurement, said second width being less than said first width, said second planar member having a second side edge and a second slot extending inwardly from said second side edge, said first and second planar members being perpendicularly interconnectable by inserting said first planar member into said second slot and said second planar member into said first slot, and directing said second planar member into a stabilizing groove formed on a surface of said first planar member, said planar members having side edges with width indicia thereon.

8. The spacing tool of claim 7, wherein said first and second planar members each have a substantially rectangular shape.

9. The spacing tool of claim 7, wherein said stabilizing groove aligned with said first slot.

10. The spacing tool of claim 7, wherein the slots in said planar members are offset from the centerlines of said planar members.

11. A spacing tool for determining the spacing between adjacent members of a structure comprising:

(a) a first rectangular planar member having a first uniform width corresponding to a first desired width for providing a first spacing measurement, said first planar member having perpendicular first and second side edges and a first slot extending inwardly from said first side edge parallel to said second side edge; and (b) a rectangular second planar member having a second different uniform width corresponding a second different desired width for providing a second spacing measurement, said second width being less than said first width, said second planar member having perpendicular third and fourth side edges and a second slot extending inwardly from said third side edge parallel to said fourth side edge, said first and second planar members being perpendicularly interconnectable by inserting said first planar member into said second slot and said second planar member into said first slot, and directing said second planar member into a stabilizing groove formed on a surface of said first planar member.

12. The spacing tool of claim 11, wherein said stabilizing groove aligned with said first slot.

13. The spacing tool of claim 11, wherein said first planar member includes a first edge adjacent said second side having indicia corresponding to the width of said first planar member, and said second planar member includes a second edge adjacent said fourth side having indicia corresponding to the width of said second planar member.

14. The spacing tool of claim 11, wherein said planar members include opposed parallel sides, said slots being offset closer to one of said parallel sides than to the other.

* * * * *